(12) United States Patent
Loisel

(10) Patent No.: US 8,413,508 B2
(45) Date of Patent: Apr. 9, 2013

(54) METHOD FOR MEASURING AN ACCELERATION USING A PIEZOELECTRIC VIBRATING ACCELEROMETER

(75) Inventor: Pierre Loisel, Courdimanche (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 12/669,319

(22) PCT Filed: Jul. 16, 2008

(86) PCT No.: PCT/FR2008/001039
§ 371 (c)(1),
(2), (4) Date: Jan. 15, 2010

(87) PCT Pub. No.: WO2009/030829
PCT Pub. Date: Mar. 12, 2009

(65) Prior Publication Data
US 2010/0186509 A1    Jul. 29, 2010

(30) Foreign Application Priority Data
Jul. 19, 2007 (FR) .................................. 07 05220

(51) Int. Cl.
*G01P 15/097* (2006.01)
(52) U.S. Cl. ...................... 73/514.29; 73/1.38
(58) Field of Classification Search .............. 73/514.29, 73/1.38
See application file for complete search history.

(56) References Cited

U.S. PATENT DOCUMENTS

| | | | |
|---|---|---|---|
| 5,113,698 A | 5/1992 | Grlj | |
| 5,834,646 A | 11/1998 | Kvisteroey | |
| 6,564,637 B1 * | 5/2003 | Schalk et al. | ............... 73/514.29 |

FOREIGN PATENT DOCUMENTS

| | | |
|---|---|---|
| EP | 1164378 | 12/2001 |
| EP | 1717589 | 11/2006 |
| GB | 2183835 | 6/1987 |
| WO | WO-95/07448 | 3/1995 |

* cited by examiner

*Primary Examiner* — John Chapman, Jr.
(74) *Attorney, Agent, or Firm* — Muncy, Geissler, Olds & Lowe, PLLC

(57) ABSTRACT

The invention provides a method of measuring an acceleration by means of a vibrating accelerometer including a piezoelectric vibrating cell, the method having the steps: of exciting the vibration cell by means of an excitation signal at a resonant frequency of the vibrating cell; of calculating an acceleration value from a detection signal that results from the excitation signal; of exciting the vibrating cell with a correction excitation signal at a correction frequency that is different from the resonant frequency; of extracting a correction signal from the detection signal, the correction being representative of an electrical characteristic that is to be corrected; and of combining the correction signal with the detection signal so as to reduce the electrical characteristic that is to be corrected.

17 Claims, 1 Drawing Sheet

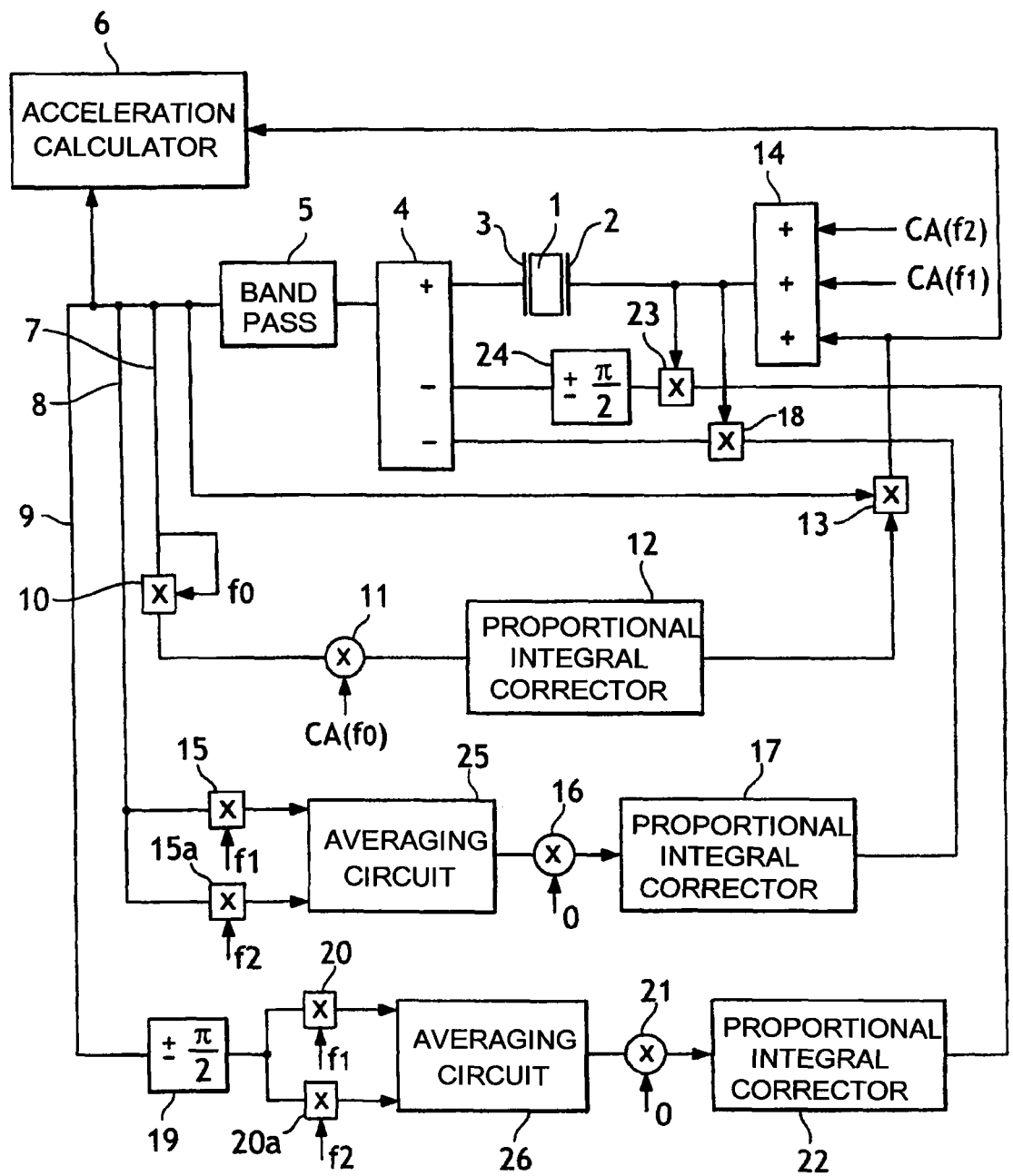

METHOD FOR MEASURING AN ACCELERATION USING A PIEZOELECTRIC VIBRATING ACCELEROMETER

The present invention relates to a method of measuring an acceleration by means of a piezoelectric vibrating accelerometer, and to the corresponding measurement device.

BACKGROUND OF THE INVENTION

Acceleration-measuring devices are known that comprise a vibrating accelerometer having a piezoelectric cell with an excitation electrode connected to an excitation control member and a detection electrode connected to an acceleration calculator, the piezoelectric cell being associated with a loop for regulating the excitation control at a resonant frequency of the piezoelectric cell.

It is also known that the output signal of amplitude that is used for calculating acceleration is representative not only of the capacitance of the piezoelectric cell, but is also influenced by parasitic characteristics, in particular a parasitic (stray) capacitance that results from the wiring or a parasitic resistance that results from defective insulation. These parasitic electrical characteristics vary not only from one device to another, but they also vary over time.

At present, the parasitic electrical characteristics are compensated on a one-size-fits-all basis so that no account is taken of variations between different devices and no account is taken of variations over time in these parasitic electrical characteristics in a single device.

OBJECT OF THE INVENTION

An object of the invention is to propose a method and a device enabling at least one parasitic electrical characteristic to be compensated accurately.

SUMMARY OF THE INVENTION

In order to achieve this object, the invention provides a method of measuring an acceleration by means of a vibrating accelerometer including a piezoelectric vibrating cell, the method comprising the steps: of exciting the vibration cell by means of an excitation signal at a resonant frequency of the vibrating cell; of calculating an acceleration value from a detection signal that results from the excitation signal; of exciting the vibrating cell with a correction excitation signal at a correction frequency that is different from the resonant frequency; of extracting a correction signal from the detection signal, the correction being representative of an electrical characteristic that is to be corrected; and of combining the correction signal with the detection signal so as to reduce the electrical characteristic that is to be corrected.

Thus, given that the detection signal at a frequency different from the resonant frequency includes only a small component that results from the capacitance of the cell, the correction signal as extracted at a frequency different from the resonant frequency may be considered as being representative solely of the parasitic electrical characteristics, such that the correction can be performed merely by subtracting the correction signal.

In an advantageous version of the invention, the correction frequency is close to the resonant frequency. This ensures that the electrical characteristics that are to be corrected, as detected at the correction frequency, are close to those that are detected at the resonant frequency.

According to another advantageous aspect of the invention, the correction signal is extracted by demodulation at the correction frequency.

According to yet another aspect of the invention, there is provided a device for measuring an acceleration, the device including a vibrating accelerometer comprising a piezoelectric vibrating cell having an excitation electrode receiving an excitation control signal at a resonant frequency of the vibrating cell and a detection electrode associated with a regulator loop enabling a detection signal to be extracted that is representative of an acceleration to which the device is subjected, at least one correction loop comprising means for extracting a correction signal at a correction frequency different from the resonant frequency, the correction signal being representative of an electrical characteristic that is to be corrected, and means for combining the correction signal with the detection signal at the resonant frequency so as to reduce the characteristic that is to be corrected.

BRIEF DESCRIPTION OF THE DRAWING

Other characteristics and advantages of the invention appear on reading the following description of a preferred and non-limiting embodiment of the invention given with reference to the sole accompanying FIGURE, which is a diagrammatic representation of the device of the invention.

DETAILED DESCRIPTION OF THE INVENTION

With reference to the FIGURE, the device of the invention includes a vibrating accelerometer comprising a piezoelectric vibrating cell 1 having attached thereto an excitation electrode and a detection electrode 3. In known manner, the piezoelectric vibrating cell 1 may be made up of two piezoelectric cell elements mounted in acceleration-sensitivity opposition.

In the embodiment shown, the detection electrode 3 is connected to a direct input of an adder 4 having its output connected to a bandpass filter 5. The output from the bandpass filter 5 is connected firstly to an acceleration calculator 6 and secondly to a main regulator loop 7, a first correction loop 8, and a second correction loop 9. The main regulator loop 7 includes a synchronous demodulator 10 operating at the resonant frequency f0 of the vibrating cell 1. A regulator member 11 has one input connected to the demodulator 10 and another input receiving an amplitude control setpoint CA(f0), and an output connected to a proportional integral corrector 12. The output from the proportional integral corrector 12 is connected to an input of a modulator 13 having its second input connected to the output of the bandpass filter 5. The output from the modulator 13 is connected to the acceleration calculator 6 and to a direct input of an adder 14 having a second direct input that receives an amplitude control signal CA(f1) at a first correction frequency f1 that is different from the resonant frequency f0, and a third direct input receiving a control signal at a second correction frequency f2 that is different from f0 and from f1. Preferably, f1 and f2 are on opposite sides of the frequency f0, and more preferably f1 and f2 present the same difference relative to f0, i.e. f1 and f2 are of the form:

$$f1=f0+\Delta f \text{ and } f2=f0-\Delta f$$

The output from the adder 14 is connected to the excitation electrode 2. The vibrating cell 1 is thus excited simultaneously by an amplitude control signal at the resonant frequency f0, and by amplitude control signals at correction frequencies f1 and f2 that are different from the resonant frequency f0.

The first correction loop 8 includes, in parallel, a synchronous demodulator 15 at the first correction frequency f1 and a synchronous demodulator 15a at the second correction frequency f2. The outputs from the demodulators 15 and 15a are connected to the input of an averaging circuit 25 that takes the average of the signals received from the demodulators 15 and 15a. The output from the averaging circuit 25 is connected to the input of a regulator member 16 having a second input receiving a regulation setpoint, here regulation on zero. The output from the regulator member 16 is connected to a proportional integral corrector 17 having its output connected to the input of a modulator 18 having a second input connected to the line powering the excitation electrode 2. The output from the modulator 18 is connected to an inverting input of the adder 4.

The second correction loop 9 includes a π/2 phase shifter member 19 that may equally well be a differentiator member or an integrator member, connected in parallel to a synchronous demodulator 20 at the correction frequency f1 and to a synchronous demodulator 20a at the second correction frequency f2. The outputs from the demodulators 20 and 20a are connected to the input of an averaging circuit 26 whose output is connected to a regulator member 21 having an input receiving a regulation setpoint, here regulation on zero. The output from the regulator member 21 is connected to a proportional integral corrector 22 having its output connected to an input of a modulator 23 having a second input connected to the line powering the excitation electrode 2 and having its output connected to a π/2 phase shifter member 24 that restores the phase of the corrector signal prior to applying it to an inverting input of the adder 4.

In operation, the demodulator 10 extracts the main signal at the resonant frequency f0 and the regulator loop 7 maintains the main excitation signal at the amplitude control setpoint CA(f0) which is supplied to the excitation electrode 2.

The regulator loop 8 extracts a correction signal at the correction frequencies f1 and f2, which signal is representative of parasitic resistances. The regulator loop 9 extracts a signal at the correction frequencies f1, f2, which signal, because of the phase shift by the phase shifter 19, is representative of parasitic capacitances. Extraction at two different correction frequencies enables correction to be performed even if one of the parasitic parameters (resistance and/or capacitance) cannot be corrected at one of the correction frequencies because of a lack of sensitivity of the cell at one of the correction frequencies for the parameter under consideration. The averaging circuits present the advantage of bringing the correction to the same amplitude as the parasitic signal when the cell is sensitive at both correction frequencies.

In order to ensure that the signal representative of the parasitic characteristics is as close as possible to the correction component of the detection signal, so that the residual effects of the parasitic characteristics are as small as possible at the output from the adder 9, it is desirable for the correction frequencies f1 and f2 to be as close as possible to the resonant frequency f0, while presenting a difference therefrom that is sufficient to ensure that the component of the correction signal resulting from the capacitance of the vibration cell proper is small compared with the same component in the detection signal at the resonant frequency f0. By way of example, for a resonant frequency f0 of 70 kilohertz (kHz), the method gives excellent results with correction signals f1 and f2 that present frequency differences of 10 kHz relative to f0.

Naturally, the invention is not limited to the embodiment described above, and embodiment variants may be applied thereto without going beyond the ambit of the invention as defined by the claims.

In particular, although the invention is described with a device that corrects parasitic capacitances and parasitic resistances, it is possible to provide a correction device that performs only one or the other of those corrections.

Although in the embodiment shown the correction signals are determined simultaneously with determining the main signal by superposing an amplitude control at the resonant frequency and amplitude controls at the correction frequencies, it is also possible to perform the invention by providing time division multiplexing of the amplitude control signals at the resonant frequency f0 and at the correction frequencies f1 and f2, the correction signal subtracted from the detection signal then being the most recent signal obtained from the correction loop.

Although the invention is described with extraction taking place at two correction frequencies at the same frequency difference from the resonant frequency f0, it is possible to perform extraction at correction frequencies that present differences from the resonant frequency that are not the same, or indeed to perform extraction as a single correction frequency.

Although the correction loop with a π/2 phase shift is described as having a common phase shifter member 19 upstream from the demodulators 20 and 20a, it is also possible to connect the phase shifter member downstream from the demodulator 20, in particular when correction is performed at a single frequency only. Similarly, the phase shifter member 24 may be connected upstream from the modulator 23.

Although the invention is described with the calculator 6 connected firstly to the output from the modulator 13 and secondly to the output from the bandpass filter 5, it is also possible for the calculator 6 to be connected to only one or the other of those elements.

The invention claimed is:

1. A method of measuring an acceleration by means of a vibrating accelerometer including a piezoelectric vibrating cell, the method comprising the steps of exciting the vibration cell by means of an excitation signal at a resonant frequency of the vibrating cell and of calculating an acceleration value from a detection signal that results from the excitation signal, the method being characterized in that it also includes the steps of exciting the vibrating cell with a correction excitation signal at a correction frequency that is different from the resonant frequency), of extracting a correction signal from the detection signal, the correction being representative of an electrical characteristic that is to be corrected, and of combining the correction signal with the detection signal so as to reduce the electrical characteristic that is to be corrected.

2. The method according to claim 1, characterized in that the correction frequency is close to the resonant frequency.

3. The method according to claim 2, characterized in that the correction frequency and the resonant frequency have a minimum difference sufficient to insure that the component of the correction signal resulting from a capacitance of the vibration cell is smaller than the component in the detection signal at the resonant frequency.

4. The method according to claim 1, characterized in that the correction signal is extracted by demodulation at the correction frequency.

5. The method according to claim 4, characterized in that it includes the step of phase shifting the detection signal by p/2.

6. The method according to claim 1, characterized in that the excitation signals at the resonant frequency and at the correction signal are superposed.

7. The method according claim 1, characterized in that it includes the steps of extracting correction signals at two different frequencies.

8. The method according to claim 7, characterized in that the two correction frequencies are on either side of the resonant frequency.

9. The method according to claim 8, characterized in that the correction frequencies present the same frequency difference relative to the resonant frequency.

10. A device for measuring an acceleration, the device including a vibrating accelerometer comprising a piezoelectric vibrating cell having an excitation electrode receiving an excitation control signal at a resonant frequency of the vibrating cell and a detection electrode associated with a regulator loop enabling a detection signal to be extracted that is representative of an acceleration to which the device is subjected, at least one correction loop comprising means for extracting a correction signal at a correction frequency different from the resonant frequency, the correction signal being representative of an electrical characteristic that is to be corrected, and means for combining the correction signal with the detection signal at the resonant frequency so as to reduce the characteristic that is to be corrected.

11. The device according to claim 10, characterized in that the correction loop includes a demodulator at the correction frequency.

12. The device according to claim 10, characterized in that it includes a correction loop directly using the signal as extracted at the correction frequency.

13. The device according to claim 12, characterized in that it includes a parallel connection of a direct correction loop and a correction loop with phase shifts, both being connected to inverting inputs of an adder.

14. The device according to claim 13, characterized in that the correction loops include extractor members at different correction frequencies that are connected in parallel.

15. The device according to claim 10, characterized in that it includes a correction loop using the signal as extracted at the correction frequency with a p/2 phase shift.

16. The device according to claim 15, characterized in that it includes a parallel connection of a direct correction loop and a correction loop with phase shifts, both being connected to inverting inputs of an adder.

17. The device according to claim 10, characterized in that the correction loop includes extractor members at different correction frequencies that are connected in parallel.

* * * * *